(12) United States Patent
Ore et al.

(10) Patent No.: US 9,161,270 B2
(45) Date of Patent: Oct. 13, 2015

(54) FAST COMBINATIONAL VOICE CALL CONTINUITY FROM LTE TO 2G/3G CS DOMAIN

(75) Inventors: Ivan Ore, Nummela (FI); Sanna Maenpaa, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1088 days.

(21) Appl. No.: 12/514,206

(22) PCT Filed: Nov. 7, 2007

(86) PCT No.: PCT/EP2007/062001
§ 371 (c)(1),
(2), (4) Date: Mar. 9, 2010

(87) PCT Pub. No.: WO2008/058877
PCT Pub. Date: May 22, 2008

(65) Prior Publication Data
US 2010/0165948 A1    Jul. 1, 2010

(30) Foreign Application Priority Data
Nov. 13, 2006 (EP) .................................. 06123967

(51) Int. Cl.
*H04W 36/00* (2009.01)
(52) U.S. Cl.
CPC ................................ *H04W 36/0033* (2013.01)
(58) Field of Classification Search
None
See application file for complete search history.

(56) References Cited

U.S. PATENT DOCUMENTS

| 7,529,560 | B2 * | 5/2009 | Nielsen et al. ............. 455/552.1 |
| 2003/0207688 | A1 * | 11/2003 | Nikkelen ...................... 455/439 |
| 2004/0063426 | A1 | 4/2004 | Hunkeler |
| 2005/0049000 | A1 * | 3/2005 | Sheynman et al. ........ 455/552.1 |
| 2008/0026752 | A1 * | 1/2008 | Flore et al. ................. 455/435.2 |
| 2008/0102815 | A1 * | 5/2008 | Sengupta et al. ............. 455/424 |
| 2008/0280612 | A1 * | 11/2008 | Bornier et al. ................ 455/436 |
| 2009/0213809 | A1 * | 8/2009 | Kwon et al. .................. 370/331 |

OTHER PUBLICATIONS

International Preliminary Examination Report from corresponding PCT Application No. PCT/EP2007/062001, dated Feb. 17, 2009, 6 pages.
ISR, WO, May 22, 2008.
3GPP TS 23.206 V7.0.0 (Sep. 2006), Technical Specification, $3^{rd}$ Generation Partnership Project; Technical Specification Group Services and System Aspects; Voice Call Continuity (VCC) between Circuit Switched (CS) and IP Multimedia Subsystem (IMS); Stage 2 (Release 7), (33 pages).
3GPP TS 25.331 V7.2.0 (Sep. 2006), Technical Specification, $3^{rd}$ Generation Partnership Project; Technical Specification Group Radio Access Network; Radio Resource Control (RRC); Protocol Specification (Release 7), (pp. 1-28, 216-220 and 399-400).

* cited by examiner

*Primary Examiner* — Mohammad Adhami
(74) *Attorney, Agent, or Firm* — Harrington & Smith

(57) ABSTRACT

The invention proposes a method for handing over a session between a source network which provides a first connection type domain and a target network which provides the first connection type domain and a second connection type domain, comprising informing a network node (e.g., a user equipment (UE)), before performing a handover from the source network to the target network, a preferred transfer domain in the target network. The invention also proposes a corresponding network node and a network control element.

22 Claims, 2 Drawing Sheets

FAST COMBINATIONAL VOICE CALL CONTINUITY FROM LTE TO 2G/3G CS DOMAIN

RELATED APPLICATION

This application was originally filed as PCT Application No. PCT/EP2007/062001 filed Nov. 7, 2007, which claims the priority of EP Patent Application No. 06123967.9 filed Nov. 13, 2006.

BACKGROUND OF THE INVENTION

1. Field of the Invention

The present invention relates to a handover between a networks having different radio access technologies, in particular in which a first network supports a packet switched (PS) connection, and a second network supports a packet switched connection and a circuit switched (CS) connection. An example for the first network may be LTE (Long Term Evolution, also referred to as High Speed OFDM Packet Access (HSOPA), (OFDM=Orthogonal Frequency Division Multiplexing).

2. Description of the Related Art

In LTE, voice will be supported via PS data using IMS as default service deliverer (VoIMS). As LTE coverage will be limited during the initial LTE rollout, there is a need to continue providing the voice call through another pre-LTE system such as 3 G (UMTS) or 2 G (GSM/CPRS). Operators handling 2 G or 3 G networks may want to keep all voice services in the CS domain. Thus there is one challenge to solve: how to provide voice call continuity for a VoIMS in LTE to a CS domain in 2 G or 3 G for terminals with one receiver. This procedure is not yet standardized and is called Single Radio Voice Call Continuity (SR VCC). Several alternatives for this procedure have been included in TR 23.882 section 7.19: "Key Issue—Service continuity between IMS over SAE/LTE access and CS domain". One of the SR VCC alternatives is called Combinational VCC and proposes to provide voice call continuity via two steps:

1. PS handover from LTE to 3 G/2 G PS domain
 2. Domain change in the same system, from 2 G/3 G PS to 2 G/3 G CS domain.

In this step, voice is being handled in 2 G/3 G PS temporarily (VoIP). In the meantime, UE is requesting a voice call establishment over CS. Once CS voice bearer is established, UE can release the PS bearer. After this, UE handles voice over CS.

This involves at least two problems. The first problem concerns the time the UE is handling voice over PS in the target domain.

According to TS 23.206 section 4.5_"Domain transfer procedures" (between a non-3GPP and 3GPP CS domain), all UE make the decision about domain transfer. In the particular case for voice continuity between LTE to a 3 G/2 G CS domain, step 2 in section 1 describes the need for UE to spend in the PS domain. It is still an open issue in the 3GPP standardization when UE will trigger the PS to CS domain change. The time UE spend in the target PS domain should be kept as short as possible due to quality reasons e.g., quality of voice over 2 G/3 G PS domain may not be as good as in CS domain.

Therefore, there is a need to speed up the domain change so that UE stays in PS domain for the shortest time.

A second problem is that an impact on legacy radio and core network due to SR VCC may be caused.

If UE does not trigger the transfer domain, then either core network or the radio access should take care of the triggering which may lead to new procedures in legacy RN/CN networks. That is, such an impact on legacy radio and core network due to SR VCC should be avoided.

Therefore, UE triggering of the domain change is needed

The problems have not been detected so far because the basic SR VCC procedures are not specified. The combinational VCC approach appears in SA2 as the most attractive solution. If selected, then procedures to speed up the domain transfer from PS to CS will be required. The second problem has been included for voice call continuity between a non-3GPP system and a 3GPP CS (TS 23.206). The first problem has not been addressed at all heretofore.

SUMMARY OF THE INVENTION

Thus, several embodiments provide solutions to overcome the problems mentioned above.

According to several embodiments of the present invention, this object is solved by a method, system, network element or entity, in which a session between a source network, which provides a first connection type domain, and a target network, which provides the first connection type domain and a second connection type domain, is carried out. A network node (e.g., a user equipment (UE)) is informed, before performing a handover from the source network to the target network, a preferred transfer domain in the target network.

In this way, the network node (e.g., user equipment (UE)) knows the preferred transfer domain in the target network early in advance, so that the network node may trigger a domain change from the first connection type domain to the second connection type domain quickly after the handover from the source network to the target network in the first connection type domain.

BRIEF DESCRIPTION OF THE DRAWINGS

Embodiments of the invention are described by referring to the enclosed drawings, in which.

DETAILED DESCRIPTION OF THE EMBODIMENTS

In the following, embodiments of the present invention are described by referring to the attached drawings.

According to embodiments of the invention, an inter-RAT (radio access technology) handover of a user equipment (UE, as an example for a network node) is performed from an LTE network (as an example for a network providing a first connection type domain) to a 2 G/3 G network (as an example for a network providing the first connection type domain and a second connection type domain). A PS (packet switched) domain is an example for the first connection type domain, and a CS (circuit switched) domain is an example for the second connection type domain.

According to the present embodiment, information regarding a preferred transfer domain in the target network (or target cell of the target network) is sent to the UE before actually carrying out the inter-RAT handover from LTE to 2 G/3 G. Then, the UE knows which is the preferred transfer domain in the target cell. By having this information well in advanced, UE can trigger the domain transfer from 2 G/3 G PS to 2 G/3 G CS as soon as the inter-RAT PS handover is completed. The following solutions can be used alone or as a combination of them:

- A) The preferred domain is a result of the combination of subscription policies (part of the UE context handled in the network) and/or target network capabilities (and/or specific capabilities of the target cell) (e.g. PS supported or not, support of VoIP or not, support of RT (realtime) PS data or not) and/or UE capabilities. For example the "preferred domain in target system"=CS for a first UE and "preferred domain in target system"=PS for a second UE in case the subscription policy of this second UE does not allow to be allocated to CS domain. This combination can be done in eNodeB or by another element in the LTE network and sent to UE via RRC specific signalling (e.g. inter-RAT handover). This solution suits well for a roaming scenario where the VPLMN operator want to control/participate into the domain selection.
- B) Notify the preferred domain in the target system to UE via IMS or CN policies. The policies can be sent via IMS registration or as part of any other procedure. This method does not take into account the radio network capability of the target cell.
- C) The preferred domain can be set as part of the neighbour cell list information and thus can be broadcasted via system information or sent to UE via RRC signalling (e.g. during the inter-RAT handover command). However subscription base decision are not possible with this method.

According to the embodiment, the UE utilizes the information as received according to the above-described embodiments and decide to trigger domain change right after the inter-RAT handover from LTE to 2 G/3 G.

Figure 1:
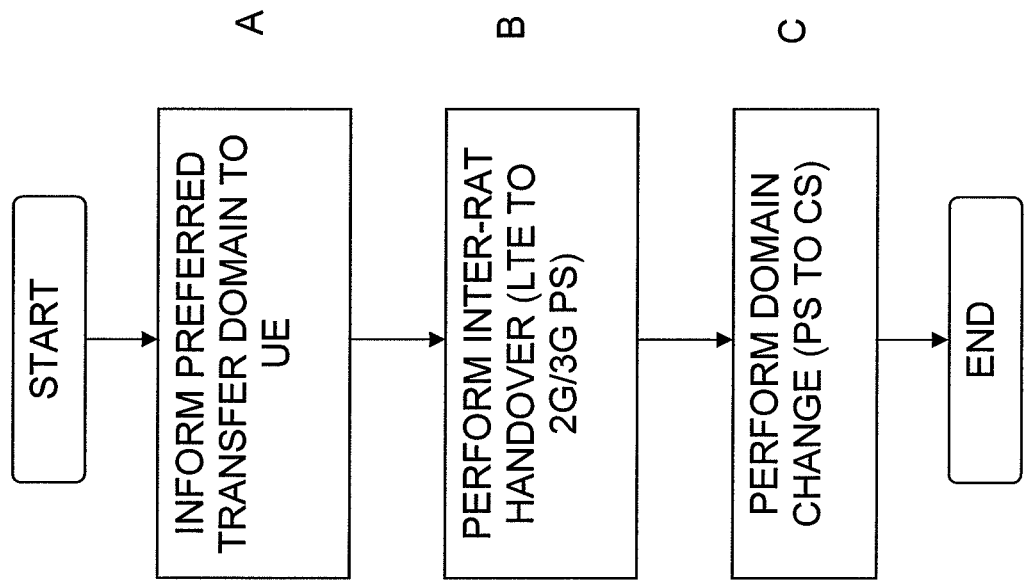
FIG. 1 shows a flow chart of a basic procedure according to an embodiment of the invention.

FIG. 1 summarizes the handover from LTE to 2 G/3 G according to the embodiments of the invention. In step A, the preferred transfer domain is informed to the UE. Thereafter, in step B, the inter-RAT handover in the PS domain is carried out. Then, in step C, the domain change in the 2 G/3 G network is performed.

Note: The embodiments are not necessarily applied to inter-RAT handovers from LTE to 2 G/3 G only, but also to a network controlled cell reselection (or better known as Cell change order, see TS 25.331) from LTE to 2 G/3 G. In this case UE with VoIP over IMS in LTE may reconnect to 2 G/3 G CS or 2 G/3 G PS after cell change order according the "preferred domain" indication suggested by the invention.

Figure 2:
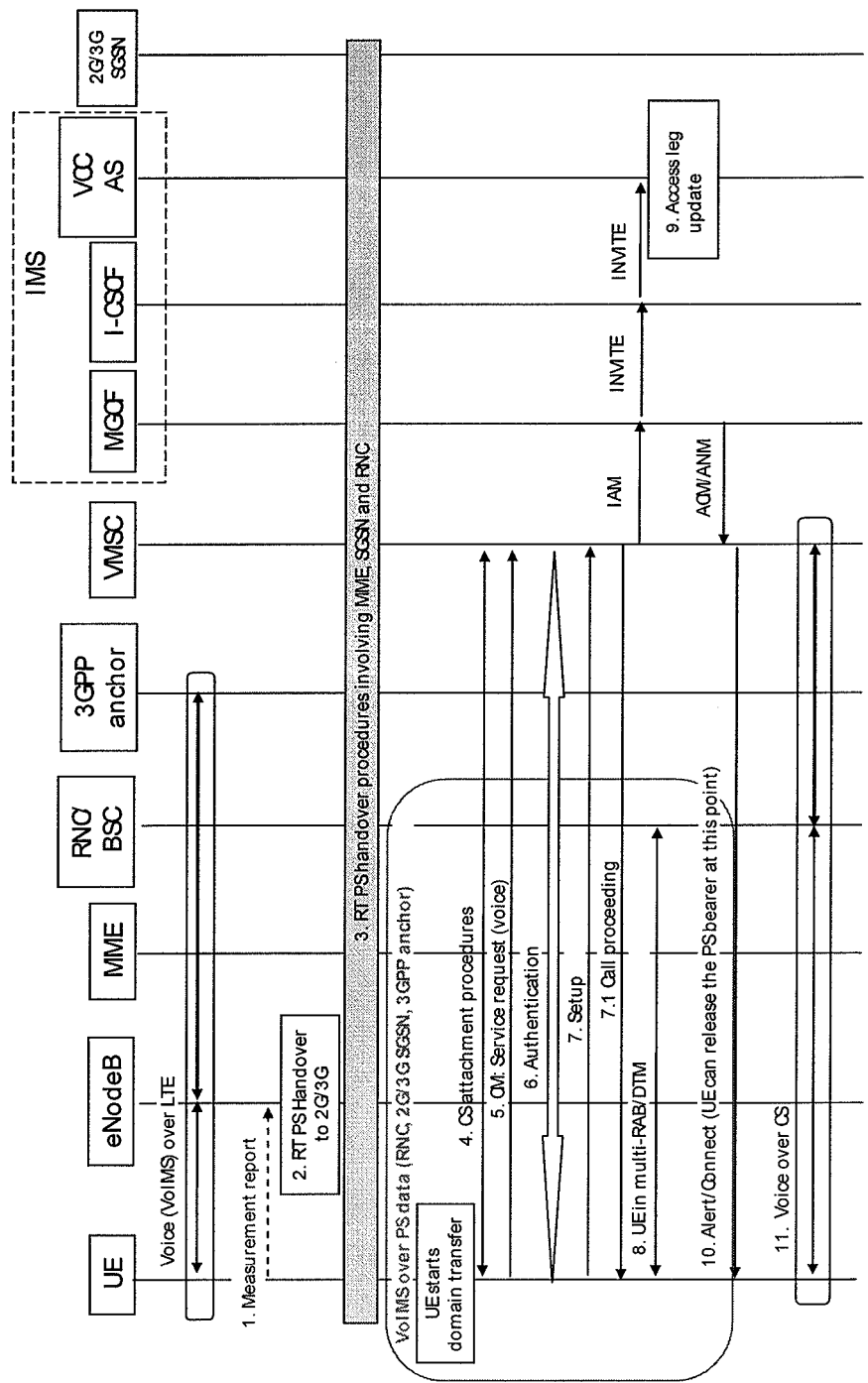
FIG. 2 shows an detailed example of a signalling flow for a combination VCC procedure according to an embodiment of the invention.

FIG. 2 shows and example of the signaling flow for the Combinational VCC procedure when a voice call in LTE is moved to CS domain. This signaling flow is used as an example and some modifications can be applied. The particular regarding the start of the handover as described above is illustrated in step 2. It can be seen that based on the embodiments, UE will trigger domain transfer from PS to CS right after inter-RAT handover from LTE to 2 G/3 G PS is completed (see step 4).

Step 1: Measurement reports are sent by UE providing information about the candidate cells in the target system. Based on the information the handover is initiated. This step can be performed in case of a coverage-based inter-system handover. In other cases, such as load or service based handover, this step may not be needed and may be omitted.

Step 2: Node B selects the target cell (2 G or 3 G). The selected target cell should support a particular set of PS data traffic classes used for voice over PS data and may also include an indication if VoIP is supported. This information is configurable by the operator and can be included as part of the neighbour cell configuration in eNode B. If no other candidate cells are found to support PS data, the handover procedure to the target system is not initiated. eNodeB should verify if the UE is IMS capable based on the UE capability information. In order to speed up the change of domain in the target system, UE should be aware of the preferred domain in the target system for voice service. The preferred domain in the target system is dictated by the rules mentioned as described above. In this example, the eNodeB sent the information to UE via inter-RAT handover command message.

Step 3: Inter-RAT handover procedures from LTE to 2 G/3 G proceeds as any normal RT inter-AS handover procedure.

Step 4: If the preferred domain for the target system is CS domain, UE starts the domain change right after the inter-RAT handover is completed. This implies that UE starts a CS attachment procedure while being the voice call handled in the PS domain. By starting the CS attachment procedures in the target system, extra-procedures in LTE for handling the security procedures are avoided and also a double registration in LTE and CS domain is avoided. In addition, the UE initiative to change domain helps to reduce the time spent by the UE in the target PS domain.

Steps 5, 6, 7: These steps are part of a typical voice originating call attempt. The security procedures does not require special treatment.

Step 8: The CS data bearer is established. In 3 G or 3.5 G, multi-RAB (multi radio access bearer) is used by the UE to be able to handled simultaneous session in CS and PS. In 2 G, enhanced DTM CS establishment is used instead.

Step 9: As a result of the voice call attempt, IMS executes the domain change procedure, as specified in TS 23.206.

Step 10: Upon reception of the Alert/Connect message, UE stops the multi-RAB/DTM session by releasing the PS bearer. Voice call is switched by UE from the PS domain to CS domain.

Step 11: Voice call proceeds in CS domain of the target system. The total time UE is temporarily allocated in the PS domain depend on the attachment procedure and voice call setup time duration. In 3 G, this time should be less than 8 seconds.

The embodiments of the invention described above provide the following advantages:
- According to the embodiments, the time of the single radio VCC procedure is reduced.
- If PS in the target domain does not support VoIMS efficiently, the invention improves the end user perception of the voice call quality.
- In 2 G, inter-BTS PS handover may not be supported or cells surrounding the target 2 G cell may not support PS. Thus, the invention reduces the probability that the VoIP in 2 G may suffer of dropped calls or long interruption breaks.

The network node (e.g., the UE) and the network control element (e.g., the eNodeB) as described above may each have a receiver, a sender and a controller, for example. In particular, the controller may include a CPU and different kinds of memory means such as RAM, ROM, a harddisk, a CD ROM reader or the like. A computer program may be stored in the memory means and may comprises software code portions for carrying out the method according to the embodiments. This computer program may be stored on a recording medium such as a CD-ROM or DVD-ROM, for example, and may be directly loadable into the work memory of the controller. Alternatively, the computer program may be loaded via the network into the memory of the controller.

It is noted that the senders and receivers mentioned above may comprise suitable interfaces which are configured for possible different access technologies of the network concerned.

The invention is not limited to the embodiments described above.

The UE is only an example for an arbitrary network node. In particular, the network node does not have to be mobile.

Also, the eNodeB is only an example for a network control element, and the functions described above may be carried out by another suitable network control element.

Furthermore, the source network and the target network are not limited to the LTE network and the 2 G/3 G network. Also other different network are possible, in which in one of the networks involved a domain change is necessary.

The features described above and shown in the drawings can be used in any arbitrary combination in accordance with one, more or all of the embodiments of the invention.

In accordance with one, more or all of the embodiments of the invention, it least one, more or all of the following features may be provided in any arbitrary combination:

A method, system, network node or entity may include or provide handing over a session between a source network which provides a first connection type domain and a target network which provides the first connection type domain and a second connection type domain, comprising informing a network node (e.g., a user equipment (UE)), before performing a handover from the source network to the target network, a preferred transfer domain in the target network.

Alternatively, a network node (e.g., a user equipment (UE)), which intends to perform a handover between a source network which provides a first connection type domain and a target network which provides the first connection type domain and a second connection type domain, may receive, before performing a handover from the source network to the target network, information regarding a preferred transfer domain in the target network.

Further alternatively, a control element may sent information regarding a preferred transfer domain in the target network to a network node (e.g., a user equipment (UE)), which intends to perform a handover between a source network which provides a first connection type domain and a target network which provides the first connection type domain and a second connection type domain, before performing a handover from the source network to the target network.

Then, a handover from the source network to the target network using the first connection type domain may be performed.

A handover from the first connection type domain to the second connection type domain in the target network may be triggered, e.g., by the network node (e.g., the user equipment (UE)), using the information regarding the preferred transfer domain.

The first connection type domain may be a packet switched domain.

The second connection type domain may be a circuit switched domain.

The preferred domain may be a result of a combination of subscription policies and/or target network (and/or capabilities of the specific target cell) capabilities (e.g. RT PS data supported or not) and/or capabilities of the network node (e.g. VoIP support or not) and/or terminal capabilities.

The combination can be effected by a network control element (e.g., node B or eNodeB).

The preferred domain in the target network may be notified to the network node using network policies (e.g., IMS or CN policies).

The preferred domain may be sent as a part of neighbour cell list information to the network node (e.g., the user equipment (UE)).

The preferred domain may be sent using a radio resource control signalling to the network node (e.g., the user equipment (UE)).

The network node may utilize the information in order to trigger a domain change immediately after the handover from the source network to the target network in the first domain.

List of abbreviations:
LTE: Long Term Evolution
eNodeB: Evolved Node B (Base Station in the evolved UTRAN)
E-UTRAN: Evolved UTRAN
SAE: System Architecture Evolution
SR VCC: Single radio voice call continuity
GSM: Global System for Mobile Communications
GPRS: General Packet radio system
UTRAN: UMTS Terrestrial Radio Access Network (TS25.401)
VoIP: Voice over IP
VoIMS: VoIP using IMS
IMS: IP Multimedia Subsystem

The invention claimed is:

1. A method comprising:
receiving, by a base station, an indication of a needed handover of a user equipment from a source network which provides a packet switched connection type domain for a session with the user equipment, to a target network which provides different connection type domains comprising a packet switched connection type domain and a circuit switched connection type domain;
identifying, by the base station, a preferred transfer domain of the different connection type domains in the target network; wherein the identifying the preferred transfer domain of the different connection type domains is based on at least one of a subscription policy for the user equipment, and comparing a radio technology of each one of the different connection type domains to a radio technology supported by the user equipment; and
sending by the base station towards the user equipment, before the handover is triggered from the source network to the target network, information informing the user equipment of the identified preferred transfer domain of the different connection type domains in the target network for the handover.

2. The method according to claim 1, wherein the information is sent in system information broadcast towards the user equipment.

3. The method according to claim 1, wherein the information comprises handover command information and where the handover command information triggers a handover of the user equipment from the source network to the preferred transfer domain in the target network.

4. The method according to claim 1, wherein the information is received by the base station from another network node prior to the sending.

5. The method according to claim 1, wherein the preferred transfer domain is the circuit switched type domain in the target network, and wherein the information triggers a domain change by the user equipment to the circuit switched type domain in the target network immediately after the handover from the source network to the target network.

6. An apparatus comprising:
at least one processor; and
at least one memory including computer program code, where the at least one memory and the computer program code are configured, with the at least one processor, to cause the apparatus to at least:
receive an indication of a needed handover of a user equipment from a source network which provides a packet switched connection type domain for a session with the user equipment, to a target network which provides different connection type domains comprising a packet switched connection type domain and a circuit switched connection type domain;
identify a preferred transfer domain of the different connection type domains in the target network, wherein the identifying the preferred transfer domain of the different connection type domains is based on at least one of a subscription policy for the user equipment, and compare a radio technology of each one of the different connection type domains to a radio technology supported by the user equipment; and
send towards the user equipment, before the handover from the source network to the target network is triggered, information informing the user equipment of the identified preferred transfer domain of the different connection type domains in the target network for the handover.

7. The apparatus according to claim 6 embodying a base station, and wherein the wherein the information is sent in system information broadcast towards the user equipment.

8. The apparatus according to claim 6, wherein the preferred transfer domain is the circuit switched type domain in the target network, and wherein the information causes a triggering of a handover by the user equipment from the packet switched connection type domain to the circuit switched connection type domain in the target network using the information.

9. The apparatus according to claim 6, wherein the information regarding the preferred transfer domain in the target network is received from a network node.

10. The apparatus according to claim 6, wherein the preferred transfer domain is the circuit switched type domain in the target network, and wherein the information triggers a domain change by the user equipment to the circuit switched connection type domain immediately after the handover from the source network to the target network.

11. A non-transitory computer-readable storage medium having computer-executable program code, the computer-executable program code executed by at least one processor to perform operations comprising:
receiving, by a base station, an indication of a needed handover of a user equipment from a source network which provides a packet switched connection type domain for a session with the user equipment, to a target network which provides different connection type-domains comprising a packet switched connection type domain and a circuit switched connection type domain;
identifying, by the base station, a preferred transfer domain of the different connection type domains in the target network, wherein the identifying the preferred transfer domain of the different connection type domains is based on at least one of a subscription policy for the user equipment, and comparing a radio technology of each one of the different connection type domains to a radio technology supported by the user equipment; and
sending by the base station towards the user equipment, before the handover from the source network to the target network is triggered, information informing the user equipment of the identified preferred transfer domain of the different connection type domains in the target network for the handover.

12. The non-transitory computer-readable storage medium according to claim 11, wherein the handover is to the circuit switched connection type domain in the target network, and wherein the information regarding the preferred transfer domain triggers a domain change to the circuit switched connection type domain in the target network immediately after the handover.

13. A method comprising:
receiving, at a user equipment, from a base station in a source network with which the user equipment has a session using a packet switched connection type domain of the source network, information before a handover to a target network is triggered at the user equipment, the information informing the user equipment of a preferred transfer domain of different connection type domains in the target network for the handover, wherein the different connection type domains comprise a packet switched connection type domain and a circuit switched connection type domain, wherein the preferred transfer domain of the different connection type domains in the target network is identified by the base station in the source network based on at least one of a subscription policy for the user equipment, and comparing a radio technology of each one of the different connection type domains to a radio technology supported by the user equipment; and
based on the received information, performing the handover from the source network to the preferred transfer domain of the different connection type domains in the target network.

14. The method according to claim 13, wherein the information comprises handover command information, and where the handover command information causes the user equipment to perform the handover from the source network to the target network.

15. The method according to claim 13, wherein the preferred transfer domain is the circuit switched domain in the target network, and wherein the information triggers a domain change by the user equipment to the circuit switched connection type domain in the target network immediately after the handover from the source network to the target network.

16. A non-transitory computer-readable storage medium having computer-executable program code, the computer-executable program code executed by at least one processor to perform operations comprising:
receiving, at a user equipment, from a base station of a source network with which the user equipment has a session using a packet switched connection type domain of the source network, information before a handover to a target network is triggered at the user equipment, the information informing the user equipment of a preferred transfer domain of different connection type domains in the target network for the handover, wherein the different connection type domains comprise a packet switched connection type domain and a circuit switched connection type domain, wherein the preferred transfer domain of the different connection type domains in the target network is identified by the base station in the source network based on at least one of a subscription policy for the user equipment, and comparing a radio technology of each one of the different connection type domains to a radio technology supported by the user equipment; and based on the received information, performing the handover from the source network to the preferred transfer domain of the different connection type domains in the target network.

17. The non-transitory computer-readable medium according to claim 16, wherein the information comprises handover command information, and where the handover command information causes the user equipment to perform the handover from the source network to the target network.

18. The non-transitory computer-readable medium according to claim 16, wherein the preferred transfer domain is the circuit switched connection type domain in the target network, and wherein the information triggers a domain change by the user equipment to the circuit switched connection type domain immediately after the handover from the source network to the target network.

19. An apparatus comprising:
   at least one processor; and
   at least one memory including computer program code, where the at least one memory and the computer program code are configured, with the at least one processor, to cause the apparatus to at least:
   receive from a base station of a source network with which the apparatus has a session using a packet switched connection type domain of the source network, information before a handover to a target network is triggered, the information informing the apparatus of a preferred transfer domain of different connection type domains in the target network for the handover, wherein the different connection type domains comprise a packet switched connection type domain and a circuit switched connection type domain, wherein the preferred transfer domain of the different connection type domains in the target network is identified by the base station in the source network based on at least one of a subscription policy for the apparatus, and comparing a radio technology of each one of the different connection type domains to a radio technology supported by the apparatus; and
   based on the information, perform the handover from the source network to the preferred transfer domain of the different connection type domains in the target network.

20. The apparatus according to claim 19 embodying a user equipment.

21. The apparatus according to claim 19, wherein the information comprises handover command information, and wherein the at least one memory including the computer program code is configured with the at least one processor to cause the apparatus to perform the handover from the source network to the target network in response to the handover command information.

22. The apparatus according to claim 19, wherein the preferred transfer domain is the circuit switched connection type domain in the target network, and wherein the at least one memory including the computer program code is configured with the at least one processor to cause the apparatus, in response to the information, to trigger a domain change with the apparatus to the circuit switched connection type domain in the target network immediately after the handover from the source network to the target network.

* * * * *